United States Patent [19]
Busch

[11] Patent Number: 5,579,032
[45] Date of Patent: Nov. 26, 1996

[54] POINTING DEVICE FOR A COMPUTER SYSTEM

[75] Inventor: John Busch, Austin, Tex.

[73] Assignee: Dell USA, L.P., Austin, Tex.

[21] Appl. No.: 506,503

[22] Filed: Jul. 25, 1995

[51] Int. Cl.⁶ ....................................... G09G 5/08
[52] U.S. Cl. .......................... 345/157; 345/168
[58] Field of Search ..................... 345/157, 156, 345/158, 159, 160, 161, 163, 164, 165, 166, 167, 168, 184; 74/471 XY, 471 R; 273/148 B; 364/708.1, 709.1, 709.08, 709.11, 709.12; D14/100, 106, 114, 115

[56] References Cited

U.S. PATENT DOCUMENTS

| D. 360,407 | 7/1995 | Collas et al. | D14/100 |
|---|---|---|---|
| 4,712,101 | 12/1987 | Culver | 345/157 |
| 4,823,634 | 4/1989 | Culver | 345/157 |
| 5,208,736 | 5/1993 | Crooks et al. | D14/106 |

*Primary Examiner*—Richard Hjerpe
*Assistant Examiner*—Xiao M. Wu
*Attorney, Agent, or Firm*—Hitt Chwang & Gaines, P.C.

[57] ABSTRACT

The present invention provides a pointing device for a computer system having a chassis. The pointing device comprises a sensor carrier slidably coupled to the chassis to allow substantially linear reciprocating movement with respect to the chassis. A first sensor, which may be a potentiometer, is coupled to the sensor carrier and is adapted to generate a first signal as a function of an angular displacement of a rotatable shaft associated with the first sensor. The pointing device further comprises a second sensor coupled to the chassis that is adapted to generate a second signal as a function of the linear reciprocating movement of the sensor carrier. The first and second signals cooperate to provide input data representing a unique point on a computer screen of the computer system. The second sensor may also be a potentiometer, an optical encoder or alternatively includes first and second electrical terminals coupled to the sensor carrier and the chassis, respectively. A resistive strip that couples the first and second electrical terminals is also provided. The resistive strip provides a resistance path between the first and second electrical terminals that generates the second signal a function of the linear reciprocating movement between the first and second electrical terminals.

39 Claims, 3 Drawing Sheets

POINTING DEVICE FOR A COMPUTER SYSTEM

The present invention is directed, in general, to computer systems and, more specifically, to a twist and slide pointing device employed as an input device for a personal computer ("PC"). The pointing device is equipped with a pop-out twist and slide tracking mechanism, allowing the device to transmit smooth, analog-type data to the PC.

BACKGROUND OF THE INVENTION

Over the last several years, PCs have made more use of pointing devices such as trackballs, pointing sticks, touchpads (or digitizers), styli or mice to increase the useability of computer programs. In particular, computer programs employing graphical user interfaces ("GUIs"), such as Microsoft Windows, make extensive use of pointing devices to access program functions.

Trackballs are characterized by a substantially immobile base adapted to cradle a freely rotatable ball. The ball protrudes from a top surface of the base, allowing a user's palm or fingertips to rotate the ball. Rotation of the ball is translated into X-Y motion (a position parameter) of a pointer on a screen of the PC. Trackballs may be provided with one or more momentary buttons (switches having discrete on and off states) that the user may selectively depress to send commands to the PC. While the trackball has proven to be an effective pointing device, it does suffer from certain disadvantages with respect to portable computers. For instance, the trackball generally requires a large volume to package. This is a distinct disadvantage, particularly in portable computers since space and size is at a premium. In addition, trackballs are usually activated by rollers, which accumulate debris from operation and thus requires frequent cleaning of the rollers.

Pointing sticks feature a more or less vertically-projecting arm that may be deflected in any direction from the vertical. The direction and amount of applied force determines the direction and distance a pointer is moved on the green (again, a position parameter). Pointing sticks are also provided with momentary buttons that the user may selectively depress to send commands to the PC. However, pointing sticks are not very intuitive devices and thus require practice for the user to become proficient in using it. Additionally, over long-term usage, some users develop "numb finger" or "dead digit" due to the excessive pushing forces applied to a basically immobile object.

Touchpads are characterized by a substantially immobile base having a touch-sensitive membranous sensor pad located on a top surface thereof. When a user touches a portion of the pad, the portion either mechanically depresses or registers a change in capacitance, effected by contact with the user, to sense the location on the pad where the user has made contact. Circuitry within the touchpad translates the sensed location into a command to the PC, perhaps causing motion of a pointer (a position parameter) or effecting other, non-position parameter commands (such as emulating clicks of a momentary button).

Some touchpads are pressure sensitive. That is, they are capable of providing a signal representative of the force that the user is bringing to bear on a portion of the touchpad. Still other touchpads are built integrally into the green of the PC (so-called "touch-sensitive" greens). However, such touch-sensitive greens are relatively expensive and delicate and have enjoyed only limited applicability. Furthermore, they tend to suffer from inconsistent operation features, such as "tap mode."

Stylus pointers are pen-like devices characterized by an elongated body in which is located a light sensor. When a user contacts the PC's screen, the light sensor produces a signal when the area of the screen beneath the pen is excited to produce light. Driver software within the PC can determine the location on the screen to which the pen is pointing by determining what area of the screen was excited at the time when the sensor generated the signal. Stylus pointers are not generally supplied with buttons, as they are often limited to entry of position parameters.

Of the above, however, the mouse has, over time, proven to be a fast and efficient pointing device in the PC environment. A mouse is characterized by a movable body that is adapted to traverse the surface of an underlying mousepad. A ball, captured in the body and slightly protruding from a bottom surface of the body, rolls along the surface as the body traverses the same. In a manner similar to that of the trackball, circuitry within the body translates ball rotation into X-Y coordinates employed to move a pointer about the screen. Mice are additionally equipped with one or more momentary buttons (again, switches having discrete on and off states) adapted to be selectively depressed by the user's manual digits. However, there are certain disadvantages associated with the mouse, particularly in a portable computer environment. For example, the over-riding problem with the mouse is that it must be removed for travel, and is a rather large device. Additionally, it suffers from the same cleaning problems the trackball experiences but to a lesser degree.

Accordingly, what is needed in the art is a pointing device that is: 1) relatively small, 2) easy to use, 3) does not need frequent cleaning, 4) inexpensive, 5) intuitive to use, 6) ergonomic such that it does not cause physical strain on the user during repetitive operations and 7) easily and compactly stores within the computer. The pointing device of the present invention addresses the above deficiencies of the prior art.

SUMMARY OF THE INVENTION

To address the above-discussed deficiencies of the prior art, the present invention provides a pointing device for a computer system having a chassis. In a preferred embodiment, the pointing device comprises a sensor carrier slidably coupled to the chassis to allow substantially linear reciprocating movement with respect to the chassis. A first sensor, preferably a potentiometer or other similar encoding device, is coupled to the sensor carrier and is adapted to generate a first signal as a function of an angular displacement of a rotatable shaft associated with the first sensor. In operations, the first sensor is, of course, electrically coupled to the computer system. The pointing device further comprises a second sensor coupled to the chassis that is adapted to generate a second signal as a function of the linear reciprocating movement of the sensor carrier. The first and second signals cooperate to provide input data representing a unique point on a computer screen of the computer system. The second sensor is preferably a potentiometer or alternatively is an optical encoder, and is electrically coupled to the computer system. The sliding action of the sensor chassis and angular displacement of the rotatable shaft combine to provide a unique pointing device that is more ergonomic and intuitive than most other conventional pointing devices. Preferably, the sensor carrier is coupled to a side wall of the chassis, which allows an ergonomic transition path from the keyboard to the pointing device. Moreover, there are no rollers that are in need of frequent cleaning. Thus, certain deficiencies of the prior art are overcome by the present invention.

In another aspect of the embodiment just described, the second sensor comprises first and second electrical terminals coupled to the sensor carrier and the chassis, respectively. A resistive strip that couples the first and second electrical terminals is also provided. The resistive strip provides a resistance path between the first and second electrical terminals that generate the second signal as a function of the linear reciprocating movement of the sensor carrier between the first and second electrical terminals.

An alternative embodiment of the present invention provides for a pointing device wherein the rotatable shaft of the first sensor is comprised of a depressible spring-biased cylinder configured to be retracted to within an interior portion of the first sensor and toggled between a retracted storage position within the first sensor and an extended operating position. The depressible spring-biased cylinder associated with this particular embodiment offers a significant advantage over prior art pointing devices; namely, it provides a compact pointing device that can be easily stored for transportation and storage.

In another aspect of the present invention, the second sensor comprises a rotatable sensor shaft associated with the second sensor. The shaft has a pinion positioned on an end thereof that is cooperable with a rack coupled to the sensor carrier. The pinion and the rack cooperate to transform the linear reciprocating movement of the sensor chassis to rotary motion of the second sensor, which in turn, generates the second signal.

In yet another aspect of the present invention, the second sensor comprises an optical encoder that has a rotatable encoder shaft associated therewith. The rotatable encoder shaft has a pinion positioned on an end thereof that is cooperable with a rack coupled to the sensor carrier. The cooperation between the rack and the pinion on the encoder shaft transforms the liner reciprocating movement of the sensor chassis to rotary motion of the rotatable encoder shaft, which in turn, generates the second signal.

A momentary switch coupled to the chassis adjacent the rotatable shaft of the first sensor for selectively transmitting commands to the computer system may also be provided in the present invention. The momentary switch used in the present invention is similar in function and basic design to the momentary switches typically associated with other pointing devices such a track ball device or a ball mouse. The ergonomic position of the momentary switches in relation to the rotatable shaft allows the user to easily actuate the momentary switch with minimum effort on the part of the user.

In another embodiment of the present invention, the pointing device is comprised of a sensor carrier slidably coupled to the chassis to allow substantially linear reciprocating movement with respect thereto. Preferably, the sensor carrier is coupled to the chassis by a sliding track that is secured to an interior wall of the chassis.

A first sensor, which is preferably a potentiometer or an optical encoder, is coupled to the sensor carrier and adapted to generate a first signal as a function of an angular displacement of a rotatable shaft associated with the first sensor. The rotatable shaft comprises a depressible spring-biased cylinder configured to be retracted to within an interior portion of the first sensor and toggled between a retracted storage position within the first sensor and an extended operating position. The rotatable shaft extends exteriorly from the chassis when in the operating position, preferably through an elongated aperture formed in a wall of the chassis and slidably moves with respect to the elongated aperture.

A second sensor is also provided in this embodiment. The second sensor, which is preferably a potentiometer or an optical encoder, is coupled to the chassis and adapted to generate a second signal as a function of a linear reciprocating movement of the sensor carrier. The first and second signals are cooperable to provide input data representing a unique point on a computer screen of the computer system. The second sensor preferably comprises a rotatable sensor shaft extending from the second sensor that has a pinion positioned on an end thereof that is engagable with a rack coupled to the sensor carrier, to thereby transform the linear reciprocating movement of the sensor carrier into a rotary motion of the rotatable sensor shaft.

In yet another embodiment of the present invention, the second sensor includes first and second electrical terminals coupled to the sensor carrier and the chassis, respectively and a resistive strip coupling the first and second electrical terminals. The resistive strip is adapted to generate the second signal as a function of the linear reciprocating movement of the sensor carrier between the first and second electrical terminals. In a preferred embodiment, the resistive strip is secured to the sensor carrier while the first electrical terminal is secured to the resistive strip. The first and second signals cooperate to provide input data representing a unique point on a computer green of the computer system.

This particular embodiment may further comprise a first momentary switch that is coupled to the chassis adjacent the rotatable shaft for selectively transmitting commands to the computer system. More preferably, a second momentary switch that is spaced apart from the first momentary switch in also provided. The second momentary switch is coupled to the chassis adjacent the rotatable shaft for selectively transmitting commands to the computer system.

In yet another aspect of the present invention, a method for using a pointing device is provided. The method comprises the steps of 1) sliding a sensor carrier in a substantially linear reciprocating movement with respect to the chassis wherein the sensor carrier is slidably coupled to the chassis to allow the substantially linear reciprocating movement with respect to the chassis, the sensor carrier having a first sensor coupled thereto; 2) generating a first signal from the first sensor as a function of an angular displacement of a rotatable shaft associated with the first sensor; and 3) generating a second signal from a second sensor coupled to the chassis as a function of the linear reciprocating movement of the sensor carrier, the first and second signals cooperating to provide input data from the first and second signals to represent a unique point on a computer screen of the computer system.

In another aspect of the method, the step of generating a second signal includes the step of establishing an electrical potential between first and second electrical terminals coupled to the sensor carrier and the chassis, respectively and generating, with a resistive strip coupling the first and second electrical terminals, the second signal as a function of the linear reciprocating movement between the first and second electrical terminals.

The method may further comprise the steps of toggling the rotatable shaft between a retracted storage position within the first sensor and an extended operating position with the rotatable shaft comprising a depressible spring-biased cylinder configured to be received within an interior portion of the first sensor.

The step of generating the second signal second may comprise the step of transforming the linear reciprocating movement of the sensor carrier into a rotary motion of a rotatable sensor shaft associated with the second sensor. In such instances, the rotatable sensor shaft has a pinion positioned on an end thereof that is engagable with a rack coupled to the sensor carrier. Alternatively, where the second sensor is an optical encoder, the step of generating the second signal second comprises the step of transforming the linear reciprocating movement of the sensor carrier into rotary motion of a rotatable encoder shaft associated therewith. The rotatable encoder shaft has a pinion positioned on an end thereof that is engagable with a rack coupled to the sensor carrier.

Additionally, the method may comprise the step of selectively transmitting commands to the computer system by actuating a momentary switch coupled to the chassis adjacent the rotatable shaft of the first sensor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
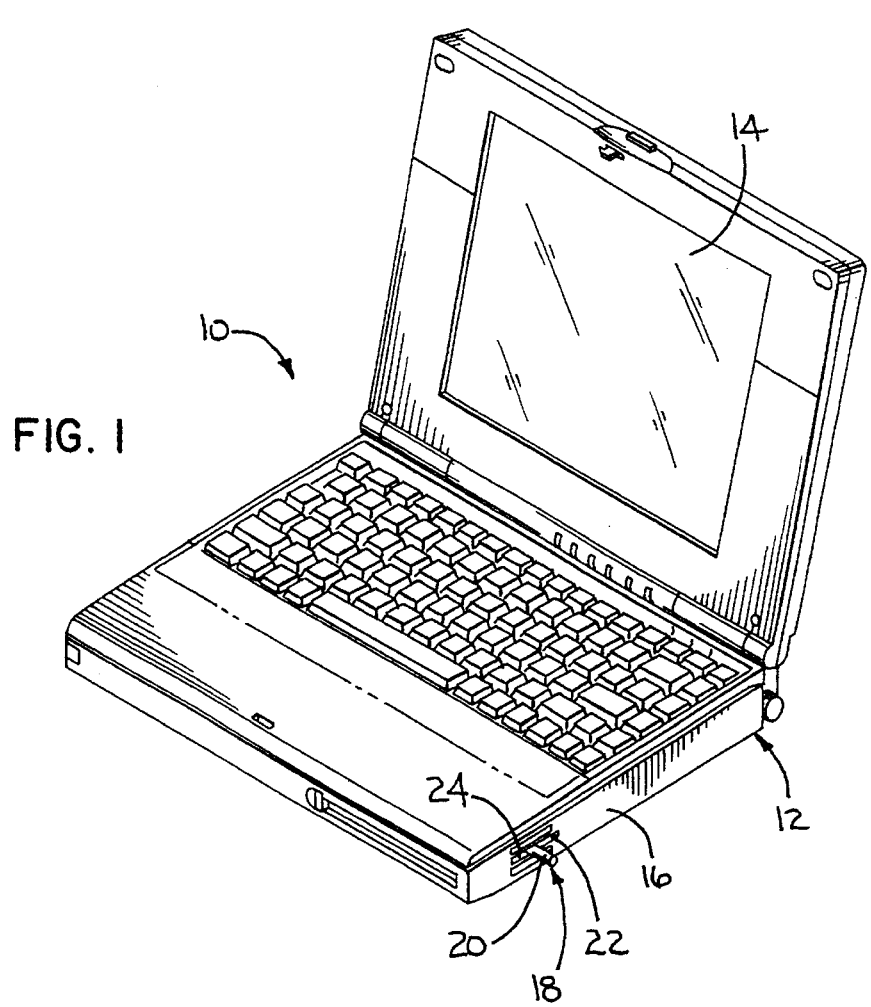
FIG. 1 illustrates an isometric view of a computer system in which the pointing device of the present invention is used.

Referring initially to FIG. 1, in a preferred embodiment thereof, there is illustrated a computer system 10 having a chassis 12 and a computer screen 14 on which a unique point, such as a cursor may be displayed. The computer system 10 is preferably a personal computer and is, more preferably, a portable computer such as a notebook computer, which is well known in the art. Incorporated into a wall 16 of the computer system 10 is the pointing device 18 of the present invention as seen from an exterior view.

Figure 2:
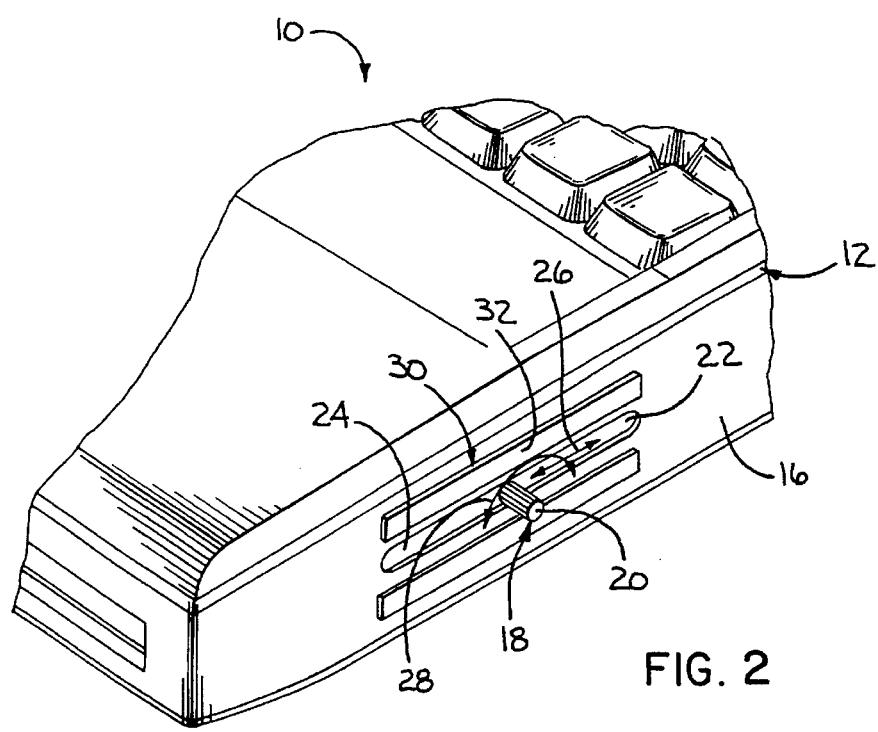
FIG. 2 illustrates an enlarged exterior view of the pointing device as incorporated into a wall of the computer system with the rotatable shaft in an operating position.

For clarity, an enlarged view of the pointing device 18 is shown in FIG. 2, to which reference will now be made in conjuction with FIG. 1. In a preferred embodiment, the pointing device 18 comprises a rotatable shaft 20 that extends exteriorly from and through an elongated aperture 22 formed in the wall 16 of the chassis 12. The rotatable shaft 20, shown in an extended operating position, is coupled to a sensor carrier 24 that slidably moves in a planar direction parallel with the plane of the elongated aperture 22, as indicated by an arrow 26. Additionally, as indicated by an arrow 28, the rotatable shaft 20 is also capable of angular displacement with respect to the sensor carrier 24. Although the software that controls the positioning of the cursor with respect to the movements of the sensor carrier 24 and the rotatable shaft 20 may be changed as desired, the preferred embodiment is for the angular displacement of the rotatable shaft 20 to control horizontal cursor movement on the computer screen 14, while the sliding movement of the sensor carrier 24 controls the vertical cursor movement on the computer screen 14. More specifically, turning the rotatable shaft 20 in a clockwise direction moves the cursor to the right, while turning the rotatable shaft 20 counter-clockwise moves the cursor to the left. With respect to the vertical direction, sliding the sensor carrier 24 toward the computer screen 14, i.e., to the rear of the computer system 10, moves the cursor down, while sliding the sensor carrier 24 away from the computer screen 14, i.e., to the front of the computer system 10, moves the cursor up.

A momentary switch 30, which is of conventional design and operation, may also included in a preferred embodiment of the present invention. The momentary switch 30 is coupled to the chassis 12 adjacent the rotatable shaft 20 in a manner described more fully below. Actuation of the momentary switch 30 may be achieved by pressing the momentary switch cover 32 positioned on the exterior of the chassis 12.

Figure 3:
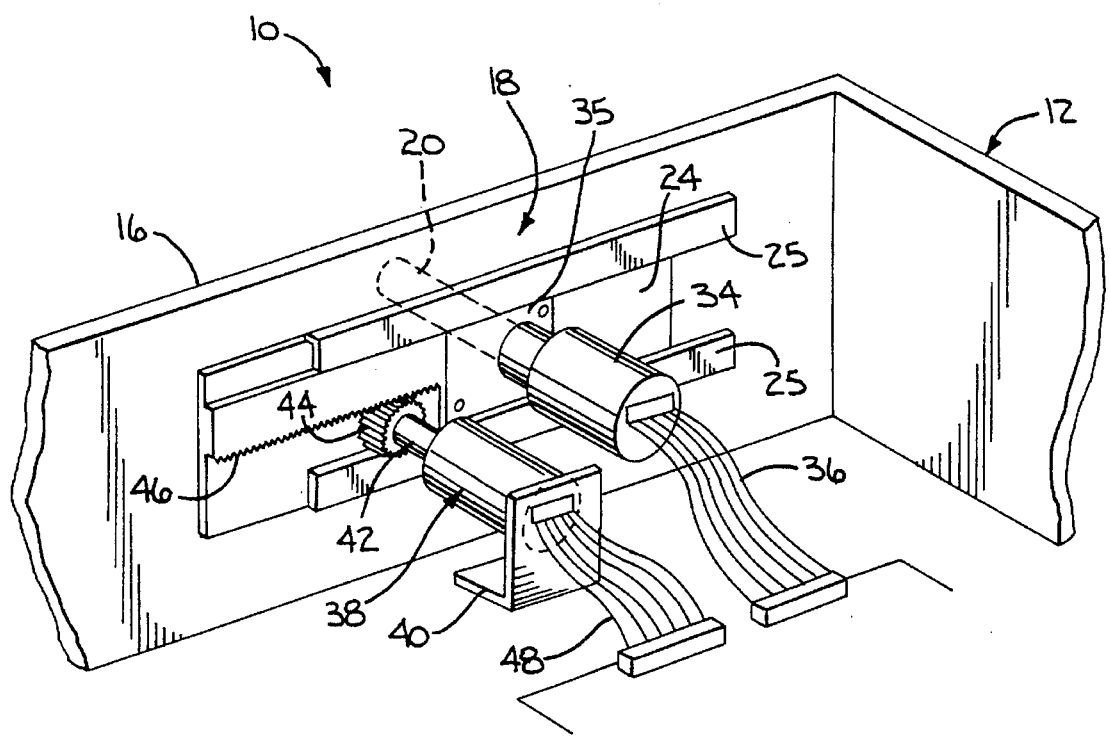
FIG. 3 illustrates an isometric view of one embodiment of the pointing device as incorporated into the interior of the computer system.

Turning now to FIG. 3, illustrated is an embodiment of the pointing device 18 as incorporated into the interior of the chassis 12. In this particular embodiment, the pointing device 18 is comprised of the sensor carrier 24 that is slidably coupled to the chassis 12 to allow substantially linear reciprocating movement with respect to the chassis 12. Preferably, the sensor carrier 24 is slidably coupled to the chassis 12 by a sliding track 25 comprised of two rail tracks that are secured to or integrally formed with the wall 16. While the linear direction of the sensor carrier 24 may be vertically oriented with respect to the wall 16, the linear direction is more preferably oriented in a horizontal direction with respect to the wall 16, as illustrated.

A first sensor 34 that is coupled to the sensor carrier 24 is also provided. The first sensor 34 may be coupled to the sensor carrier 24 in various ways. For example, a retention plate 35, which is secured to the sensor carrier 24, may couple the first sensor 34 to the sensor carrier 24. This coupling allows the first sensor 34 to slidably move with the sensor carrier 24 as the sensor carrier 24 is linearly reciprocated. The first sensor 34, which is preferably either a conventional potentiometer or a conventional optical encoder, is adapted to generate a first signal as a function of the angular displacement of the rotatable shaft 20 associated with the first sensor 34; that is, as the rotatable shaft 20 is rotated with respect to the sensor carrier 24, a signal is generated by the first sensor 34. From this signal, the processing circuitry of the computer system 10 (FIG. 1), via the software, determines either a horizontal or vertical point on a computer screen (FIG. 1). It should be understood that the the processing circuitry used in conjunction with the present invention with respect to all embodiments is of conventional design and well known to those skilled in the art. The signal is transmitted from the first sensor 34 to the computer system 10 via a flexible cable 36 that has a length sufficient to allow the first sensor 34 to traverse the entire linear path of the sensor carrier 24.

The rotatable shaft 20 of the first sensor 34 preferably comprises a depressible spring-biased cylinder configured to be retracted to within an interior portion of the first sensor 34 and toggled between a retracted storage position within the first sensor 34 and an extended operating position. While the details of the mechanical aspects of the rotatable shaft 20 and the first sensor 34 are not illustrated, it should be understood that the rotatable shaft 20 and, in some embodiments, the first sensor of the present invention are of the stone type currently used in other electrical devices. In such devices, the shaft, which may be a volume or other similar type of control knob, is typically recessed into the control panel. When the user desires to alter the control's setting, the user will depress and release the shaft causing it to extend outwardly from the control panel to an operating position. After the adjustments are made, the user then depresses the shaft back to the storage position. The rotatable shaft 20 functions in the same manner as just described with respect to being toggled between the retracted storage position and the extended operating position.

A second sensor 38 is also provided in this particular embodiment. The second sensor 38, which is preferably a conventional potentiometer or an optical encoder, is coupled to the chassis 12 and is adapted to generate a second signal as a function of the linear reciprocating movement of the sensor carrier 24. The second sensor 38 may be coupled to the chassis 12 via a support bracket 40 that is secured to the chassis 12 by conventional means. It will of course, be appreciated that other conventional means known for coupling electronic components to a chassis may also be used.

The second sensor 38 is preferably a potentiometer (or other rotary encoder) that comprises a rotatable sensor shaft 42 associated with and extends from the second sensor 38. A pinion 44 positioned on an end of the rotatable sensor shaft 42 is engagable with a rack 46 coupled to the sensor carrier 24. The rack 46 is preferably a bar with teeth on one face for gearing with the pinion 44. The cooperation of the pinion 44 and the rack 46 transforms the linear reciprocating movement of the sensor carrier 24 into rotary motion of the rotatable sensor shaft 42, to thereby produce a second signal From this second signal, the processing circuitry of the computer system 10 (FIG. 1), via the operating software stored within the computer system 10 (FIG. 1), is able to determine either a horizontal or vertical point on a computer screen (FIG. 1). The second signal is transmitted from the second sensor 38 to the computer system 10 by a flexible cable 48 that has a length sufficient to allow the second sensor 38 to traverse the entire linear path of the sensor carrier 24. The first and second signals are cooperable through operation of the computer system's processing circuitry to provide input data representing a unique point on the computer screen 14 (FIG. 1 ).

Figure 4:
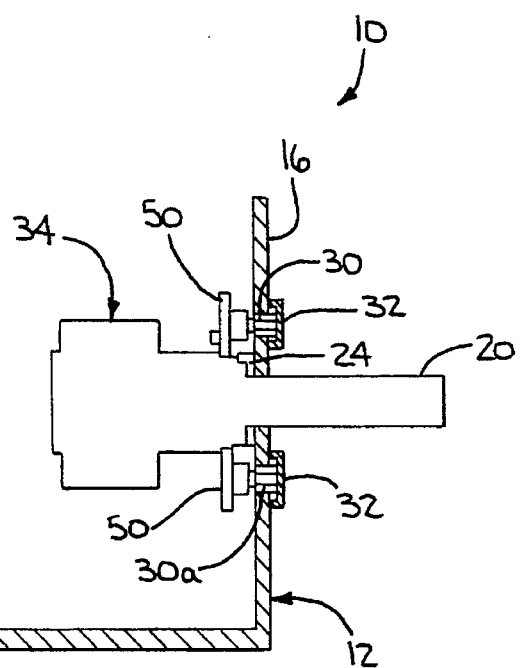
FIG. 4 illustrates a partial cross-sectional view of FIG. 3 taken along the line 4—4 showing the coupling of the rotational shaft, sensor and momentary switches.

Turning now to FIG. 4, there is illustrated a cross-sectional view of FIG. 3 taken along the line 4—4 through the first sensor 34 showing a plurality of the momentary switches 30, 30a for selectively transmitting commands to the computer system 10 (FIG. 1). As illustrated in the preferred embodiment, the momentary switches 30, 30a are coupled to the chassis 12 and are electrically coupled by conventional means to printed wiring assembly members 50, which are, in turn, electrically coupled to the motherboard (not shown). The momentary switches 30, 30a are preferably microswitches typically used in pointing device applications that have an actuation depression distance of approximately one-half to one millimeter; that is, the microswitch is actuated when depressed by a distance of approximately one-half to one millimeter. As previously stated, the momentary switches 30, 30a may be actuated by the user pressing the momentary switch covers 32 with the same hand that is used for controlling and operating the pointing device.

Figure 5:
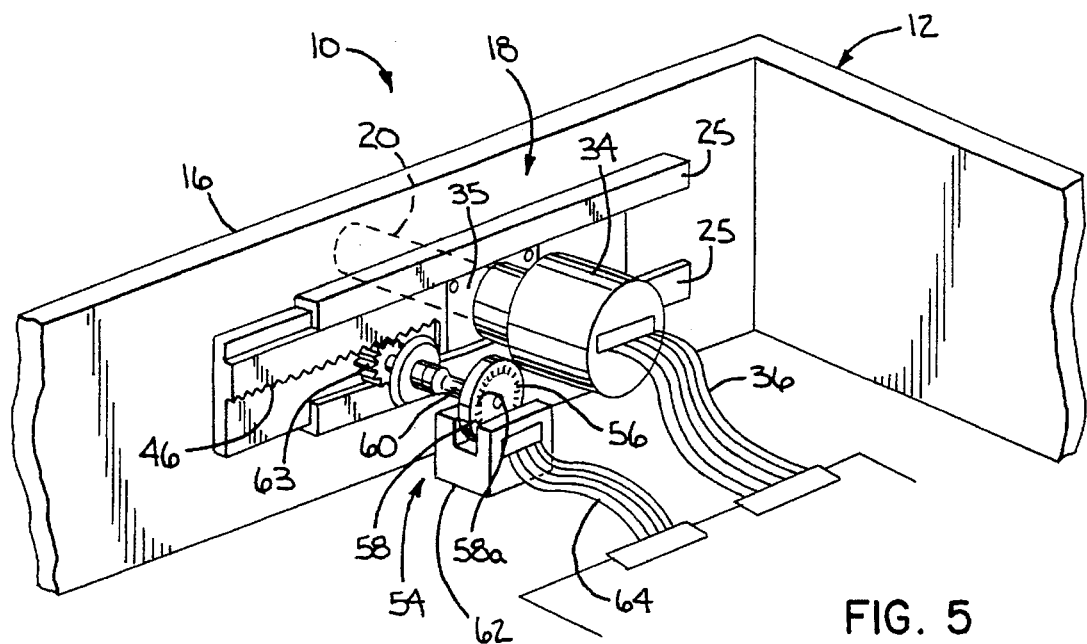
FIG. 5 illustrates an isometric view of another embodiment of the pointing device as incorporated into the interior of the computer system.

Turning now to FIG. 5, there is illustrated an alternate embodiment of the present invention. The first sensor 34 is coupled to the sensor carrier 24 that were previously discussed are also present in this embodiment. The first sensor 34 may be coupled to the sensor carrier 24 in various ways. For example, a retention plate 35, which is secured to the sensor carrier 24, may couple the first sensor 34 to the sensor carrier 24. This coupling allows the first sensor 34 to slidably move with the sensor carrier 24 as the sensor carrier 24 is linearly reciprocated. The first sensor 34, which is preferably either a conventional potentiometer or a conventional optical encoder, is adapted to generate a first signal as a function of the angular displacement of the rotatable shaft 20 associated with the first sensor 34; that is, as the rotatable shaft 20 is rotated with respect to the sensor carrier 24, a signal is generated by the first sensor 34. From this signal, the processing circuitry of the computer system 10 (FIG. 1), via the software, is able to determine either a horizontal or vertical point on a computer screen (FIG. 1). The signal is transmitted from the first sensor 34 to the computer system 10 through a flexible cable 36 that has a length sufficient to allow the first sensor 34 to traverse the entire linear path of the sensor carrier 24.

The rotatable shaft 20 of the first sensor 34 preferably comprises a depressible spring-biased cylinder configured to be retracted to within an interior portion of the first sensor 34 and toggled between a retracted storage position within the first sensor 34 and an extended operating position. While the details of the mechanical aspects of the rotatable shaft 20 and the first sensor 34 are not illustrated, it should be understood that the rotatable shaft 20 and, in some embodiments, the first sensor of the present invention are of the same type currently used in other electrical devices, as discussed above.

A second sensor, which is preferably an optical encoder 54 is also included in this embodiment. The optical encoder 54 is comprised of: 1) a bar slotted wheel 56 having holes 58a which pass fight and spokes 58 which alternately block light that are spaced apart by predetermined distances to generate a signal upon rotation thereof, 2) a rotatable encoder shaft 60 extending from the bar slotted wheel 56, 3) a pinion 63 positioned on an end of the rotatable encoder shaft 60 that is engagable with the rack 46 coupled to the sensor carrier 24 and 4) an optical sensor set 62. The rack 46 through its engagement with the pinion 63 transforms the reciprocating movement of the sensor carrier 24 into rotary motion of the rotatable encoder shaft 60, which, in turn, causes rotation of the bar slotted wheel 56. The alternating hole and spoke pattern produces fight and dark areas 58,58a and is read by the sensor set 62. The optical sensor set 62 is preferably of conventional design and typically includes a light emitting diode (LED) and a photoelectric sensor (not shown) that is capable of converting the passed and blocked pattern into electrical current.

As the bar slotted wheel 56 is rotated, the LED emits light that is passed through the holes 58 on the bar slotted wheel to the photoelectric sensor 62 to produce a second signal represented by combinations of passed and blocked light 58,58a. These combinations are compared through operation of the software storm within the computer system by the processing circuitry of the computer system 10 (FIG. 1). The processing circuitry compares the processed data with character data stored in the memory of the computer system to produce position data. From this position data, the processing circuitry of the computer system 10 (FIG. 1) determines either a horizontal or vertical point on a computer screen (FIG. 1). The signal is transmitted from the optical encoder 54 to the computer system 10 via a flexible cable 64. The signals from the first sensor 34 and optical encoder 54 are cooperable via the computer system's circuitry to provide input data representing a unique point on the computer screen 14 (FIG. 1).

Figure 6:
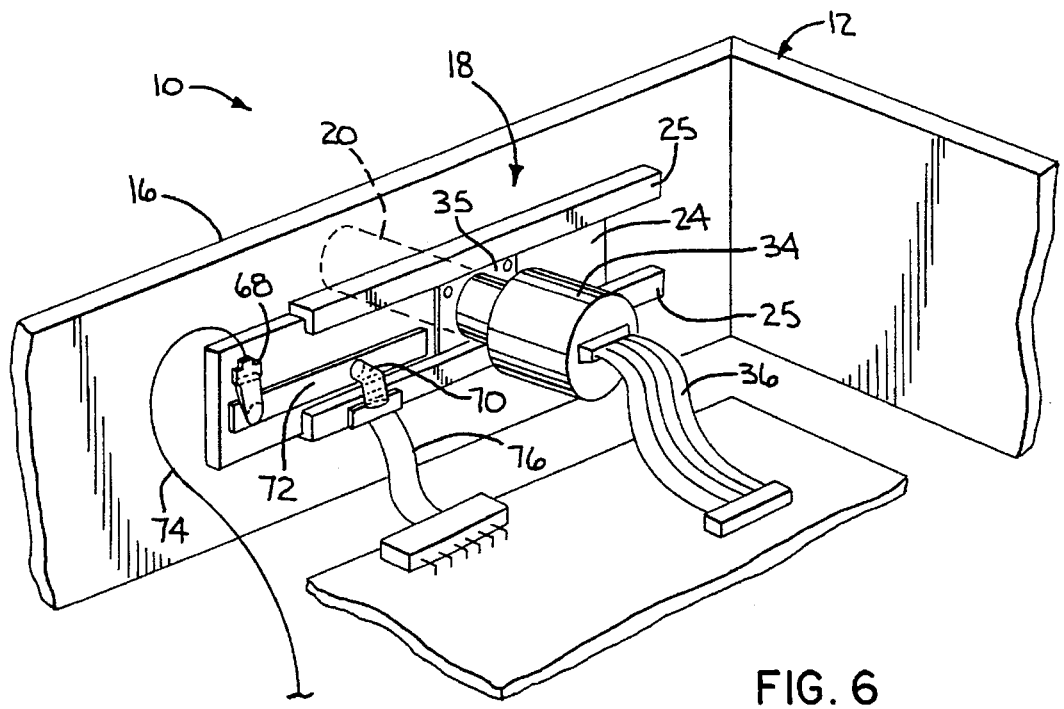
FIG. 6 illustrates an isometric view of yet another embodiment of the pointing device as incorporated into the interior of the computer system.

Turning now to FIG. 6, there is illustrated another embodiment of the pointing device covered by the present invention. As with the previously discussed embodiments, the first sensor 34, which is coupled to the sensor carrier 24, is also provided in this particular embodiment. The sensor carrier 24 is preferably slidably coupled to the chassis 12 by sliding tracks 25 while the first sensor 34 may be coupled to the sensor carrier 24 in various ways. For example, a retention plate 35, which is secured to the sensor carrier 24, may couple the first sensor 34 to the sensor carrier 24. This coupling allows the first sensor 34 to slidably move with the sensor carrier 24 as the sensor carrier 24 is linearly reciprocated during operation. The first sensor 34, which is preferably either a conventional potentiometer or a conventional optical encoder, is adapted to generate a first signal as a function of the angular displacement of the rotatable shaft 20 associated with the first sensor 34; that is, as the rotatable shaft 20 is rotated with respect to the sensor carrier 24, a signal is generated by the first sensor 34. From this signal, the processing circuitry of the computer system 10 (FIG. 1), via the software, is able to determine either a horizontal or vertical point on a computer screen (FIG. 1). The signal is transmitted from the first sensor 34 to the computer system 10 via a flexible cable 36 that has a length sufficient to allow the first sensor 34 to traverse the entire linear path of the sensor carrier 24.

The rotatable shaft 20 of the first sensor 34 preferably comprises a depressible spring-biased cylinder configured to be retracted to within an interior portion of the first sensor 34 and toggled between a retracted storage position within the first sensor 34 and an extended operating position. While the details of the mechanical aspects of the rotatable shaft 20 and the first sensor 34 are not illustrated, it should be understood that the rotatable shaft 20 and, in some embodiments, the first sensor of the present invention are of the same type currently used in other electrical devices, as discussed above.

The second sensor 38 is also present and is coupled to the chassis 12 and adapted to generate a second signal as a function of a linear reciprocating movement of the sensor carrier 24. The second sensor 38 in this particular embodiment includes first and second electrical terminals 68,70 coupled to the sensor carrier 24 and the chassis 12, respectively. A resistive strip 72 couples the first and second electrical terminals 68,70. An electrical current is supplied to the resistive strip 72 by a conductive wire 74 that is connected to the first electrical terminal 68. Preferably, the resistive strip 72 is secured to the sensor carrier 24, and the first electrical terminal 68 is, in turn, secured to the resistive strip 72.

The second signal that is a function of the distance between the first and second electrical terminals 68,70 is generated as the sensor carrier 24 is linearly reciprocated during operation. As the distance between the first and second electrical terminals 68,70, increases, the resistance increases; conversely, as the distance between the electrical terminals 68,70 becomes shorter, the resistance decreases. The changes in the resistance are transmitted from the second terminal 70 as a second data signal by an electrical cable 76. The second data signal is then processed by the computer system's software and processing circuitry. From this processed data signal, the computer system determines a horizontal or vertical position. The processing circuitry then uses the first and second signals to determine a unique point on a computer green 14 of the computer system 10 (FIG. 1).

With the various embodiments having been described, a method of operation will now be briefly discussed with general reference to FIGS. 1 through 6. Generally, the rotatable shaft 20 will be in the retracted storage position. To use the pointing device 18, the user depresses and releases the rotatable shaft 20, which releases it from the storage position. The spring-biased mechanism urges the rotatable shaft 20 from the storage position to extend it outwardly from the chassis 12. Once the rotatable shaft 20 is extended, the user can then grasp it for angular movement with respect to the chassis 12. As the user rotates the rotatable shaft 20, the rotation causes the first sensor 34 to generate a first signal. The user may simultaneously linearly reciprocate the sensor carrier 24, thereby causing the second sensor 38 to produce a second signal. Both the first and second signals are transmitted to and processed by the computer system's 10 conventional processing circuitry to determine a unique point on the computer screen 14.

The generation of the first and second signals is a function of the degree of rotation that occurs with respect to each sensor when the sensors are either potentiometers or optical encoders. Regarding the first sensor 34, the rotation is effected by the user rotating the rotatable shaft 20. In the second sensor 38, however, the rotation is effected by the linear reciprocating movement of the sensor carrier 24. The linear reciprocating movement of the sensor carrier 24 is transformed into rotary motion by the engagement of the rack 46 with the pinion 44. Thus, as the sensor carrier 24 is reciprocated, the second sensor 38 produces the second signal.

Where the second sensor 38 is comprised of the first and second electrical terminals 68,70, an electrical potential is established between the first and second electrical terminals 68,70 by the conductive wire 74 transmitting current to the resistive strip 72. The second signal is generated as a function of the distance between the first and second electrical terminals 68,70 as the sensor carrier 24 is linearly reciprocated.

Upon processing of the first and second signals by the processing circuitry, a unique point is displayed on the computer screen 14 in the form of a cursor. When the cursor is positioned at the desired location, the user can then send a command to the computer system and select the desired point by depressing the momentary switch 30. When the user completes his use of the pointing device, he can then depress the rotatable shaft 20 to retract it to the storage position.

From the above description, it is apparent that the present invention provides a pointing device for a computer system having a chassis. The pointing device comprises a sensor carrier slidably coupled to the chassis to allow substantially linear reciprocating movement with respect to the chassis. A first sensor, which may be a potentiometer, is coupled to the sensor carrier and is adapted to generate a first signal as a function of an angular displacement of a rotatable shaft associated with the first sensor. The pointing device further comprises a second sensor coupled to the chassis that is adapted to generate a second signal as a function of the linear reciprocating movement of the sensor carrier. The first and second signals cooperate to provide input data representing a unique point on a computer screen of the computer system. The second sensor may also be a potentiometer, an optical encoder or alternatively includes first and second electrical terminals coupled to the sensor carrier and the chassis, respectively. A resistive strip that couples the first and second electrical terminals is also provided. The resistive strip provides a resistance path between the first and second electrical terminals that generates the second signal a function of the linear reciprocating movement between the first and second electrical terminals.

Although the present invention and its advantages have been described in detail, those skilled in the art should understand that they can make various changes, substitutions and alterations herein without departing from the spirit and scope of the invention in its broadest form.

What is claimed is:

1. A pointing device for a computer system having a chassis and comprising:
   a sensor carrier slidably coupled to said chassis to allow substantially linear reciprocating movement with respect thereto;
   a first sensor coupled to said sensor carrier and adapted to generate a first signal as a function of an angular displacement of a rotatable shaft associated with said first sensor, said rotatable shaft configured to be retracted to within an interior portion of said chassis and toggled between a retracted storage position within said chassis and an extended operating position; and
   a second sensor coupled to said chassis and adapted to generate a second signal as a function of said linear reciprocating movement of said sensor carrier, said first and second signals cooperable to provide input data representing a unique point on a computer screen of said computer system.

2. The pointing device of claim 1 wherein said first sensor is a potentiometer or an optical encoder.

3. The pointing device of claim 1 wherein said second sensor is a potentiometer.

4. The pointing device of claim 1 wherein said second sensor is an optical encoder.

5. The pointing device of claim 1 wherein said second sensor comprises:
   first and second electrical terminals coupled to said sensor carrier and said chassis, respectively; and
   a resistive strip coupling said first and second electrical terminals and adapted to generate said second signal as a function of said linear reciprocating movement between said first and second electrical terminals.

6. The pointing device of claim 1 wherein said rotatable shaft of said first sensor is comprised of a depressible spring-biased cylinder configured to be retracted to within an interior portion of said first sensor and toggled between a retracted storage position within said first sensor and an extended operating position.

7. The pointing device of claim 1 wherein said second sensor comprises a rotatable sensor shaft associated with said second sensor and having a pinion positioned on an end thereof, said pinion engagable with a rack coupled to said sensor carrier, to thereby transform said linear reciprocating movement of said sensor carrier into rotary motion of said rotatable sensor shaft.

8. The pointing device of claim 1 wherein said second sensor comprises an optical encoder having a rotatable encoder shaft associated therewith, said rotatable encoder shaft having a pinion positioned on an end thereof engagable with a rack coupled to said sensor carrier, to thereby transform said linear reciprocating movement of said sensor carrier into rotary motion of said rotatable encoder shaft.

9. The pointing device of claim 1 further comprising one or more momentary switches coupled to said chassis adjacent said rotatable shaft of said first sensor for selectively transmitting commands to said computer system.

10. The pointing device of claim 1 wherein said first and second sensors are electrically coupled to said computer system for transmitting said first and second signals.

11. A pointing device associated with a computer system having a chassis and comprising:
    a sensor carrier slidably coupled to said chassis to allow substantially linear reciprocating movement with respect thereto;
    a first sensor coupled to said sensor carrier and adapted to generate a first signal as a function of an angular displacement of a rotatable shaft associated with said first sensor, said rotatable shaft comprising a depressible spring-biased cylinder configured to be retracted to within an interior portion of said first sensor and toggled between a retracted storage position within said first sensor and an extended operating position; and
    a second sensor comprising a rotatable sensor shaft extending from said second sensor and having a pinion positioned on an end thereof, said pinion engagable with a rack coupled to said sensor carrier, to thereby transform said linear reciprocating movement of said sensor carrier into rotary of said rotatable sensor shaft, said second sensor coupled to said chassis and adapted to generate a second signal as a function of said linear reciprocating movement of said sensor carrier, said first and second signals cooperable to provide input data representing a unique point on a computer screen of said computer system.

12. The pointing device of claim 11 wherein said first sensor is a potentiometer or an optical encoder.

13. The pointing device of claim 11 wherein said second sensor is a potentiometer.

14. The pointing device of claim 11 wherein said second sensor is an optical encoder.

15. The pointing device of claim 11 further comprising a momentary switch coupled to said chassis adjacent said rotatable shah for selectively transmitting commands to said computer system.

16. The pointing device of claim 15 further comprising a plurality of said momentary switches.

17. The pointing device of claim 15 wherein said momentary switch has a momentary switch cover thereon accessible from the exterior of said chassis.

18. The pointing device of claim 11 wherein said first and second sensors are electrically coupled to said computer system for selectively transmitting said first and second signals.

19. The pointing device of claim 11 wherein said sensor carrier is coupled to said chassis by a sliding track secured to an interior wall of said chassis.

20. The pointing device of claim 11 wherein said rotatable shaft extends through an elongated aperture formed in a wall of said chassis and slidably moves with respect to said elongated aperture.

21. A method for operating a pointing device for a computer system having a chassis, said method comprising the steps of:

sliding a sensor carrier in a substantially linear reciprocating movement with respect to said chassis, said sensor carrier slidably coupled to said chassis to allow said substantially linear reciprocating movement with respect to said chassis, said sensor carrier having a first sensor coupled thereto;

generating a first signal from said first sensor as a function of an angular displacement of a rotatable shaft associated with said first sensor, said rotatable shaft configured to be retracted to within an interior portion of said chassis and toggled between a retracted storage position within said chassis and an extended operating position; and generating a second signal from a second sensor coupled to said chassis as a function of said linear reciprocating movement of said sensor carrier, said first and second signals cooperating to provide input data from said first and second signals to represent a unique point on a computer screen of said computer system.

22. The method of claim 21 wherein said first sensor is a potentiometer or an optical encoder.

23. The method of claim 21 wherein said second sensor is a potentiometer.

24. The method of claim 21 wherein said second sensor is an optical encoder.

25. The method of claim 21 wherein said step of generating a second signal includes the step of:

establishing an electrical potential between first and second electrical terminals coupled to said sensor carrier and said chassis, respectively, and generating, with a resistive strip coupling said first and second electrical terminals, said second signal as a function of said linear reciprocating movement between said first and second electrical terminals.

26. The method of claim 21 further comprising the steps of toggling said rotatable shaft between a retracted storage position within said first sensor and an extended operating position, said rotatable shaft comprising a depressible spring biased cylinder configured to be received within an interior portion of said first sensor.

27. The method of claim 21 wherein said step of generating said second signal second comprises the step of transforming said linear reciprocating movement of said sensor carrier into a rotary motion of a rotatable sensor shaft associated with said second sensor, said rotatable sensor shaft having a pinion positioned on an end thereof and engagable with a rack coupled to said sensor carrier.

28. The method of claim 21 wherein said step of generating said second signal second comprises the step of transforming said linear reciprocating movement of said sensor carrier into rotary motion of a rotatable encoder shaft associated therewith, said rotatable encoder shaft having a pinion positioned on an end thereof engagable with a rack coupled to said sensor carrier.

29. The method of claim 21 further comprising the step of selectively transmitting commands to said computer system by actuating a first momentary switch coupled to said chassis adjacent said rotatable shaft of said first sensor.

30. The method of claim 29 further comprising the step of selectively transmitting commands to said computer system by actuating a second momentary switch coupled to said chassis adjacent said rotatable shah of said first sensor.

31. A pointing device for a computer system having a chassis and comprising:

a sensor carrier slidably coupled to said chassis to allow substantially linear reciprocating movement with respect thereto;

a first sensor coupled to said sensor carrier and adapted to generate a first signal as a function of an angular displacement of a rotatable shaft associated with said first sensor, said rotatable shaft comprised of a depressible spring-biased cylinder configured to be retracted to within an interior portion of said first sensor and toggled between a retracted storage position within said first sensor and an extended operating position; and a second sensor coupled to said chassis and adapted to generate a second signal as a function of a linear reciprocating movement of said sensor carrier, said second sensor including:

first and second electrical terminals coupled to said sensor carrier and said chassis, respectively; and a resistive strip coupling said first and second electrical terminals and adapted to generate said second signal as a function of said linear reciprocating movement between said first and second signals, said first and second signals cooperable to provide input data representing a unique point on a computer screen of said computer system.

32. The pointing device of claim 31 wherein said first sensor is a potentiometer or an optical encoder.

33. The pointing device of claim 31 further comprising a first momentary switch coupled to said chassis adjacent said rotatable shaft for selectively transmitting commands to said computer system.

34. The pointing device of claim 33 further comprising a second momentary switch spaced apart from said first momentary switch, said second momentary switch coupled to said chassis adjacent said rotatable shaft for selectively transmitting commands to said computer system.

35. The pointing device of claim 34 wherein said momentary switch as a momentary switch cover thereon accessible from the exterior of said chassis.

36. The pointing device of claim 31 wherein said first and second sensors are electrically coupled to said computer system for selectively transmitting said first and second signals.

37. The pointing device of claim 31 wherein said sensor carrier is coupled to said chassis by a sliding track secured to an interior wall of said chassis.

38. The pointing device of claim 31 wherein said rotatable shaft extends through an elongated aperture formed in a wall of said chassis and slidable moves with respect to said elongated aperture.

39. The pointing device of claim 31 wherein said resistive strip is secured to said sensor carrier and said first electrical terminal is secured to said resistive strip.

* * * * *

UNITED STATES PATENT AND TRADEMARK OFFICE
CERTIFICATE OF CORRECTION

PATENT NO. : 5,579,032
DATED : November 26, 1996
INVENTOR(S) : John Busch

It is certified that error appears in the above-indentified patent and that said Letters Patent is hereby corrected as shown below:

Col. 4, line 31, "green" should be --screen--.

Col. 8, line 51, "fight" should be --light--.

Col. 9, line 6, "storm" should be --stored--.

Col. 10, line 15, "green" should be --screen--.

Col. 12, line 52, "shah" should be --shaft--.

Col. 14, line 6, "shah" should be --shaft--.

Signed and Sealed this

Twenty-fifth Day of February, 1997

Attest:

BRUCE LEHMAN

*Attesting Officer*     *Commissioner of Patents and Trademarks*